(12) United States Patent
Folco et al.

(10) Patent No.: US 10,331,883 B2
(45) Date of Patent: Jun. 25, 2019

(54) MALICIOUS CODE AVOIDANCE USING TRANSPARENT CONTAINERS

(71) Applicant: INTERNATIONAL BUSINESS MACHINES CORPORATION, Armonk, NY (US)

(72) Inventors: Rafael Camarda Silva Folco, São Paulo (BR); Breno Henrique Leitão, São Paulo (BR); Rafael Peria de Sene, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 15/278,070

(22) Filed: Sep. 28, 2016

(65) Prior Publication Data

US 2018/0089423 A1    Mar. 29, 2018

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/55* | (2013.01) |

(Continued)

(52) U.S. Cl.
CPC ............ *G06F 21/552* (2013.01); *G06F 9/455* (2013.01); *G06F 21/577* (2013.01); *G06F 2221/034* (2013.01)

(58) Field of Classification Search
CPC .. G06F 21/53; G06F 2221/2149; G06F 21/50; G06F 21/52; G06F 21/577; G06F 2221/034; G06F 21/44; G06F 21/55; G06F 21/552; G06F 21/56; G06F 21/561; G06F 21/565; G06F 21/566; G06F 21/567; G06F 21/568; G06F 9/442; G06F 11/1417; G06F 11/1438; G06F 21/575; G06F 21/554; G05B 2219/24198
See application file for complete search history.

(56) References Cited

U.S. PATENT DOCUMENTS 9,003,231 B1    4/2015 Graves
9,524,389 B1 *  12/2016 Roth ..................... G06F 21/554
(Continued)

OTHER PUBLICATIONS

Abed et al., "Intrusion Detection System for Applications Using Linux Containers", Security and Trust Management, vol. 9331 of the series Lecture Notes in Computer Science,Oct. 21, 2015, pp. 123-135.

(Continued)

*Primary Examiner* — Trong H Nguyen
(74) *Attorney, Agent, or Firm* — Michael O'Keefe

(57) ABSTRACT

A method, computer program product, and system for managing container security, the method including consuming a recipe queue on a first checker container, wherein the first checker container is on a first host of a computer system, and the recipe queue comprises a predefined set of rules, storing the first checker container recipe queue result in the first checker container, comparing the first checker container recipe queue result with an expected result of the recipe queue, wherein the expected result is stored in the first checker container, and following a first fail procedure from a plurality of fail procedures, based on the first checker container recipe queue result not matching the expected result.

15 Claims, 6 Drawing Sheets

(51) Int. Cl.
*G06F 21/57* (2013.01)
*G06F 9/455* (2018.01)

(56) References Cited

U.S. PATENT DOCUMENTS

| | | | | |
|---|---|---|---|---|
| 2008/0046680 | A1* | 2/2008 | Nagata | G06F 21/51 |
| | | | | 711/207 |
| 2008/0244114 | A1* | 10/2008 | Schluessler | G06F 13/28 |
| | | | | 710/24 |
| 2010/0122343 | A1 | 5/2010 | Ghosh et al. | |
| 2011/0078791 | A1* | 3/2011 | Prakash | G06F 17/30265 |
| | | | | 726/22 |
| 2011/0283279 | A1* | 11/2011 | Graves | G06F 9/44589 |
| | | | | 718/1 |
| 2013/0145463 | A1* | 6/2013 | Ghosh | G06F 21/56 |
| | | | | 726/22 |
| 2014/0283077 | A1 | 9/2014 | Gallella et al. | |
| 2014/0331277 | A1* | 11/2014 | Frascadore | H04L 63/20 |
| | | | | 726/1 |
| 2016/0275292 | A1* | 9/2016 | Chestna | G06F 21/577 |
| 2016/0342786 | A1* | 11/2016 | Gerebe | G06F 21/52 |
| 2016/0381058 | A1* | 12/2016 | Antony | H04L 63/1425 |
| | | | | 726/23 |
| 2016/0381075 | A1* | 12/2016 | Goyal | H04L 63/20 |
| | | | | 713/176 |
| 2017/0054759 | A1* | 2/2017 | Lee | H04L 63/20 |
| 2017/0093923 | A1* | 3/2017 | Duan | H04L 63/1408 |
| 2018/0007051 | A1* | 1/2018 | Vij | H04L 63/06 |

OTHER PUBLICATIONS

Hayden, "Securing Linux Containers", SANS Institute InfoSec Reading Room, Jul. 26, 2015, pp. 1-25.
Johnston, "Docker 1.3: signed images, process injection, security options, Mac shared directories", Oct. 16, 2014, pp. 1-16.
Petazzoni, "Containers & Docker: How Secure Are They?", Aug. 21, 2013, pp. 1-30.
Hallyn, "Secure Linux containers cookbook", Strengthen lightweight containers with SELinux and Smack, Feb. 3, 2009, pp. 1-10.
Puppet, "How it works—Model the desired state of your infrastructure", Define and orchestrate change. On any device, anywhere., Printed May 27, 2016, pp. 1-4.
Mell et al., "The NIST Definition of Cloud Computing", Recommendations of the National Institute of Standards and Technology, National Institute of Standards and Technology, Special Publication 800-145, Sep. 2011, 7 pages.
IBM: List of IBM Patents or Patent Applications Treated as Related (Appendix P), Mar. 20, 2018, pp. 1-2.

* cited by examiner

MALICIOUS CODE AVOIDANCE USING TRANSPARENT CONTAINERS

BACKGROUND

The present invention relates generally to a method, system, and computer program product for computing, and more particularly to a method, system, and computer program product for security of containers.

Cloud computing is a network of remote servers hosted over the internet. A user of cloud computing may use a remote server or host rather than a personal computer or a local server. Virtual machines are used extensively in cloud computing. A computer server may be run by a central core computer program called a kernel. Virtualization allows the computer server to contain multiple hosts or virtual machines, where each virtual machine or host can be accessed remotely by the user over the internet. The host may appear to be an independent computer server by use of virtualization. The host may have one or more containers. A container is a set of processes isolated from other parts of the computer server, and other hosts. A container can encapsulate an application and its dependency. An example of a kernel is a Linux® kernel. An example of a container is a Linux® container. Linux® is a registered trademark of Linus Torvalds. Security of containers is important to the computer server and to each virtual machine. Security concerns may include introduction of exploitable vulnerabilities in containers and possibly in the host. Any vulnerabilities in the kernel interface may be exploited by the container to harm the host. For example, running containers and applications which require root privileges, which are host privileges, may harm the host. Any vulnerabilities in the host may in turn affect other hosts and containers on the computer server.

SUMMARY

Embodiments of the present invention disclose a method, computer program product, and system for managing container security, the method including consuming a recipe queue on a first checker container, wherein the first checker container is on a first host of a computer system, and the recipe queue comprises a predefined set of rules, storing the first checker container recipe queue result in the first checker container, comparing the first checker container recipe queue result with an expected result of the recipe queue, wherein the expected result is stored in the first checker container, and following a first fail procedure from a plurality of fail procedures, based on the first checker container recipe queue result not matching the expected result.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
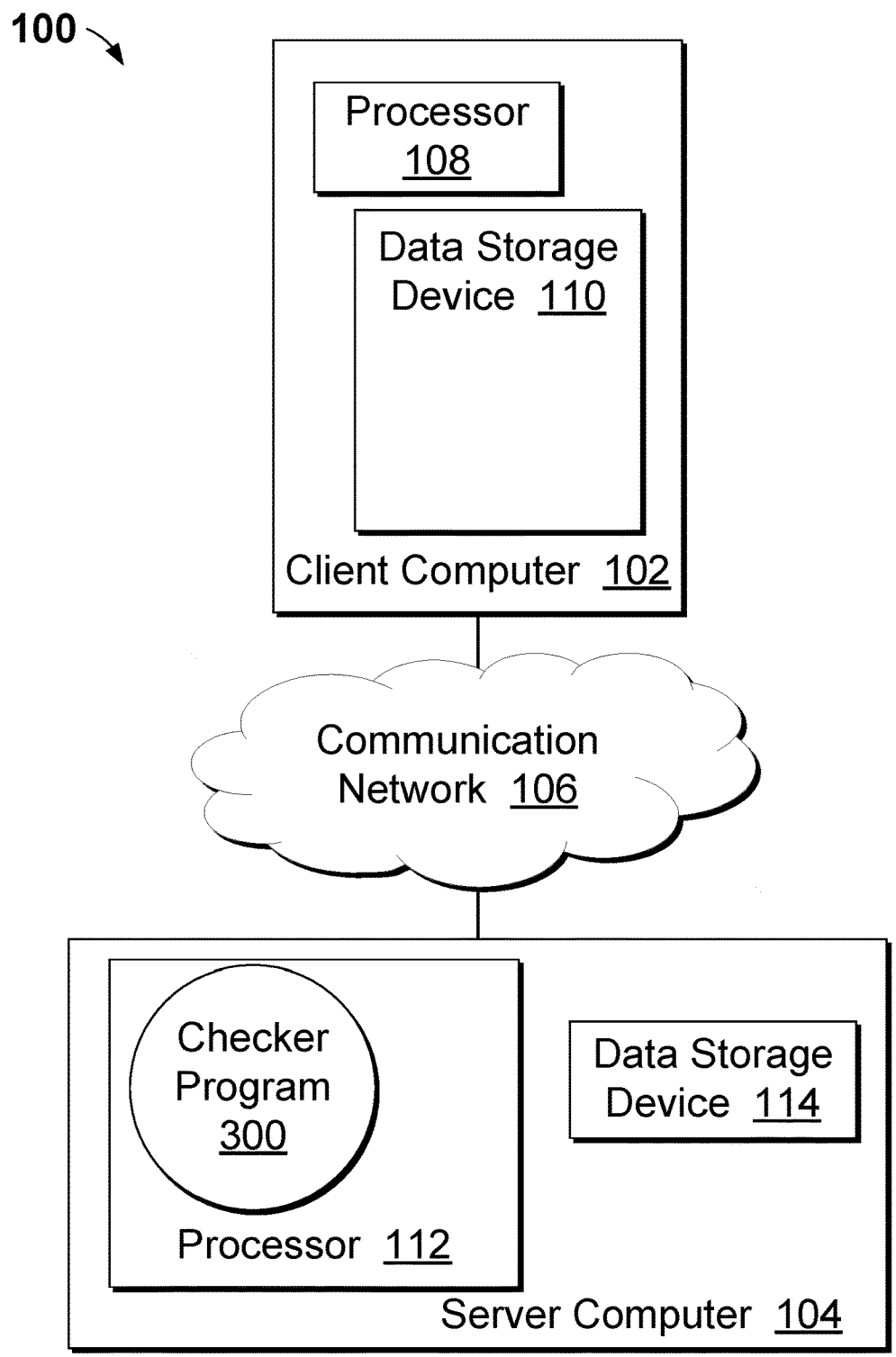
FIG. 1 is a functional block diagram illustrating a distributed data processing environment, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", "etc.", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Embodiments of the present invention are related to the field of computing, and more particularly to security of containers. The following described exemplary embodiments provide a method, computer server, and computer program product to, among other things, provide security checks by creating a checker container in a host, testing the checker container in the host, and identifying a possible security issue.

A cloud provider may use virtualization to have virtual machines available to customers over the Internet. The cloud provider, or cloud service provider, may also run services, such as database services, using virtual machines. The cloud provider may offer Software as a Service (SaaS), or Platform as a Service (PaaS) to customers. Many PaaS and SaaS providers are built on Infrastructure as a Service (IaaS) which generally implies that workloads from the customer are run in virtual machines. Virtual machines frequently use containers.

A container is a set of processes that are isolated from other parts of a machine or computer server or computer system, such as from other containers and other hosts. Isolation refers to a requirement that execution of an application in one host cannot affect execution of an application in another host on the same computer system. A container can encapsulate an application dependency. For example, if a website relies on a particular version of the PHP: Hypertext Preprocessor scripting language, the container can encapsulate that version. As a result, multiple versions of the same scripting language can co-exist in the same computer server, each in a different container. A computer server may have multiple hosts and each host may have one or more containers. The one or more contains share the same kernel as the host. Resource controls refers to the ability to constrain a workload to a specific set of resources.

A namespace may be used to provide a form of isolation. While using namespace, processes running within a container cannot see, nor influence, processes running in another container, nor processes in the host system.

A kernel is a computer program which manages the central core of a computer server operating system. The kernel has complete control over events in the computer server. The kernel is the first program loaded on startup, and manages the remainder of the startup, as well as input/output requests from software, translating them into data processing instructions for the CPU. The kernel is a fundamental part of a computer's operating system. The kernel manages resource control, which is the ability to constrain a workload to a specific set of resources. The kernel running a computer server may manage resources of the computer server, such as a central processing unit (CPU), memory, network, and input/output, may prioritize resources, may provide limitation on resources, and may communicate with computing peripherals, such as monitors, keypads, printers, and speakers. All of the containers on all of the hosts of a computer server share the same kernel. If a container contains a vulnerability which may compromise the kernel, all the other containers in the computer server may be affected. It is important to identify potentials hazards using an effective approach which may help reduce expenses associated with maintenance, repair and downtime of the computer server or an individual host if there is contamination of the individual host or computer server.

A container may have a network stack, and may not have privileged access to sockets or interfaces of another container. A network stack or a protocol stack is an implementation of a computer network protocol suite. In an embodiment, a host system can be set such that containers may interact with other containers through their respective network interfaces, and may interact with external hosts. A host user or administration may set a host system to allow Internet Protocol (IP) traffic between containers, allow containers to ping each other, send/receive User Datagram Protocol (UDP) packets, and establish Transmission Control Protocol (TCP) connections. Alternatively, the host user may restrict communication between containers. From a network architecture point of view, all containers on a given host are sitting on a bridge interface, meaning a relationship between the containers on a given host may be similar to a relationship between physical machines connected through a common Ethernet switch.

Critical code of the kernel may be loaded into a protected area of memory, which prevents it from being overwritten by other applications or parts of the operating system. Operations of the kernel are performed in kernel space, including execution of applications and programs, and managing interruptions. Operations of a user of a host are performed in a host user space, including running programs in a graphical user interface (GUI), and writing text. The separation of kernel space and user space is important to prevent interference from each host user space, to prevent performance degradation, and to prevent exploitation of any vulnerabilities, among other reasons. It is advantageous to prevent malicious code or vulnerability exploiters to compromise the kernel and affect other containers.

In a container, the kernel is outside of a scope of a container image, meaning that it is not necessary to change the container image when upgrading the kernel. A failure may be associated an application running on a container, or may be associated with the kernel, either of which may indicate that security of the container may be compromised.

In an example, a computer server with a kernel may have between ten and five hundred hosts, although less than ten and greater than five hundred hosts may also occur. Each of the hosts may have, for example, ten thousand containers.

The present invention generally relates to container security and maintaining container security by creating a checker container in a host to run security rules, or recipes, to secure the container stack. The container stack is a software that implements the components of the container. An embodiment by which to create a checker container in a host and run security rules or recipes on the checker container is described in detail below by referring to the accompanying drawings in FIGS. 1 to 6. Those skilled in the art will readily appreciate that the detailed description given herein with respect to these figures is for explanatory purposes as the invention extends beyond these limited embodiments.

Referring now to FIG. 1, a functional block diagram illustrating a system 100 in a networked computer environment, in accordance with an embodiment of the present invention, is shown. The system 100 may include a client computer 102 and a server computer 104. The client computer 102 may communicate with the server computer 104 via a communications network 106 (hereinafter "network"). The client computer 102 may include a processor 108, a data storage device 110, and is enabled to interface with a user, and to communicate with the server computer 104. The server computer 104 may include a data storage device 114 and a processor 112 that is enabled to run a checker program 300. In an embodiment, the client computer 102 may operate as an input device including a user interface while the checker program 300 may run primarily on the server computer 104. In an alternative embodiment, the checker program 300 may run primarily on the client computer 102 while the server computer 104 may be used for processing a storage of data used by the checker program 300.

It should be noted, however, that processing for the checker program 300 may, in some instances be shared amongst the client computer 102 and the server computer 104 in any ratio. In another embodiment, the checker program 300 may operate on more than one server computer 104, client computer 102, or some combination of server computers 104 and client computers 102. For example, a plurality of client computers 102 may communicate across the network 106 with a single server computer 104.

The network 106 may include wired connections, wireless connections, fiber optic connections, or some combination thereof. In general, the network 106 can be any combination of connections and protocols that will support communications between the client computer 102 and the server computer 104. The network 106 may include various types of networks, such as, for example, a local area network (LAN), a wide area network (WAN) such as the Internet, a telecommunication network, a wireless network, a public switched network and/or a satellite network.

In various embodiments, the client computer 102 and/or the server computer 104 may be, for example, a laptop computer, tablet computer, netbook computer, personal computer (PC), a desktop computer, a personal digital assistant (PDA), a smart phone, a mobile device, or any programmable electronic device capable of communicating with the server computer 104 via the network 106. As described below with reference to FIG. 4, the client computer 102 and the server computer 104 may each include internal and external components. In other embodiments, the server computer 104 may be implemented in a cloud computing environment, for example, cloud computing nodes 510, as described in relation to FIGS. 5 and 6 below. Similarly, the client computer 102 may be implemented in the cloud computing environment, for example, laptop computer 540C as shown in FIG. 5.

In an embodiment, the system 100 may include any number of client computers 102 and/or server computers 104; however only one of each is shown for illustrative purposes only. It may be appreciated that FIG. 1 provides only an illustration of an implementation and does not imply any limitations with regard to the environments in which different embodiments may be implemented. Many modifications to the depicted environments may be made based on design and implementation requirements.

The system 100 may be generally configured to perform actions to improve security of containers in a computer server.

The checker program 300, (hereinafter "program"), and associated methods are described and explained in further detail below with reference to FIGS. 2-6. The checker program 300 may be managed by a scheduler which designates a particular container of each host as the checker container, operates the checker program, and associates a recipe queue with each particular container.

Figure 2:
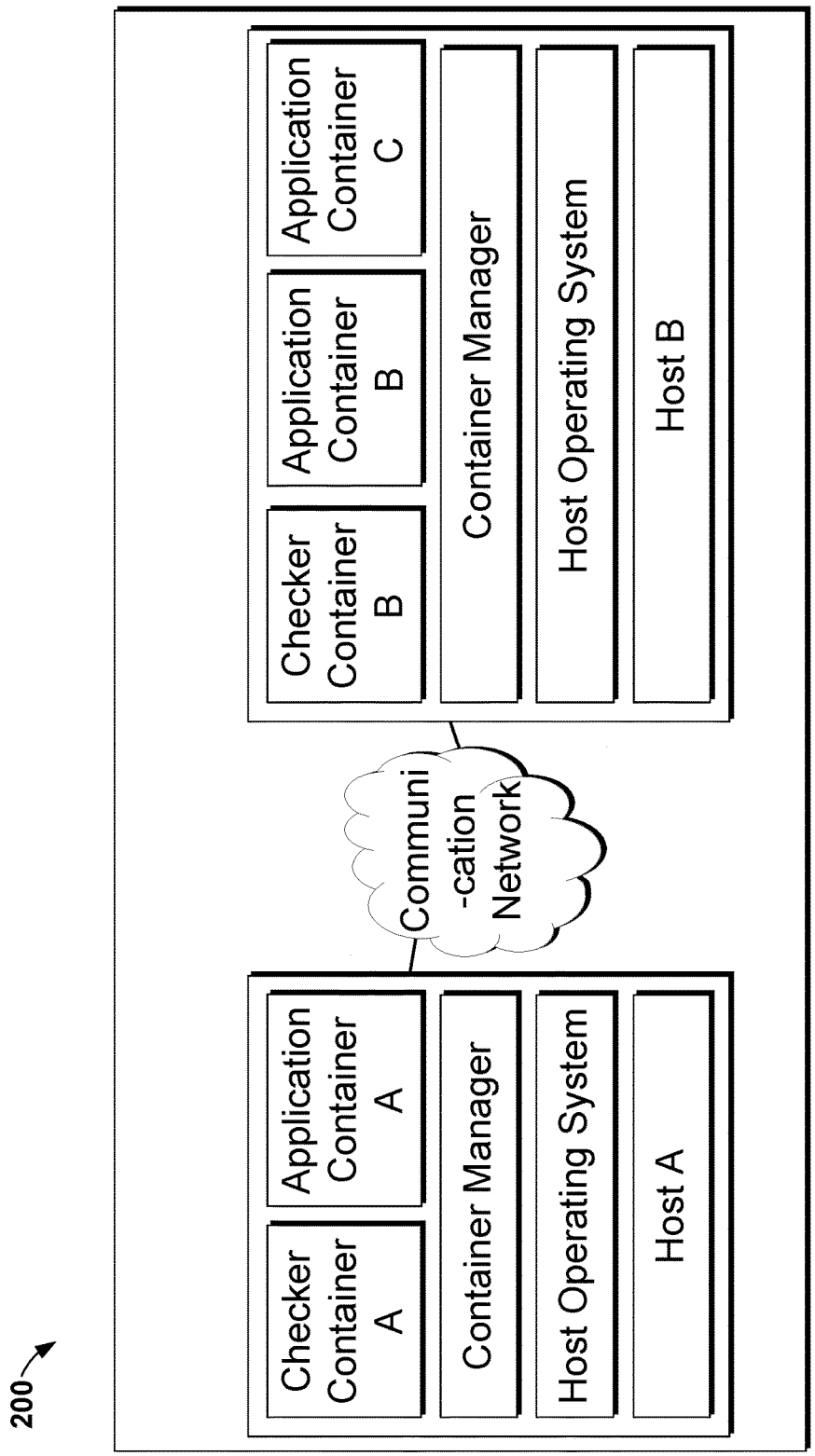
FIG. 2 is a functional block diagram illustrating a virtual computer system environment, in accordance with an embodiment of the present invention.

Referring now to FIG. 2, and with continued reference to FIG. 1, a simplified diagram of a virtual computer system environment (hereinafter "virtual system") 200 is shown in accordance with an embodiment of the present invention. The virtual system 200 is shown with two hosts, Host A and Host B. The Host A and the Host B each include a Host Operating System and a Container Manager. In this example, Host A includes Checker Container A and Application Container A, while Host B includes Checker Container B, Application Container B, and Application Container C. The Host A and the Host B may communicate with each other, with other hosts on the virtual system 200, with other computing peripherals, and with other computer systems, through the Communication Network. The Communication Network of FIG. 2 may be substantially the same as the communications network 106 of FIG. 1.

The Host A and the Host B may each have any number of containers. As described above, a container is a set of processes isolated from other parts of the computer server, and other hosts. The Host A and the Host B may each have a checker container, Checker Container A and Checker Container B, respectively. The use of the checker container for security is further described below.

As described above, there may be any number of hosts on a computer system. An example of two hosts on a computer system is described above.

Figure 3:
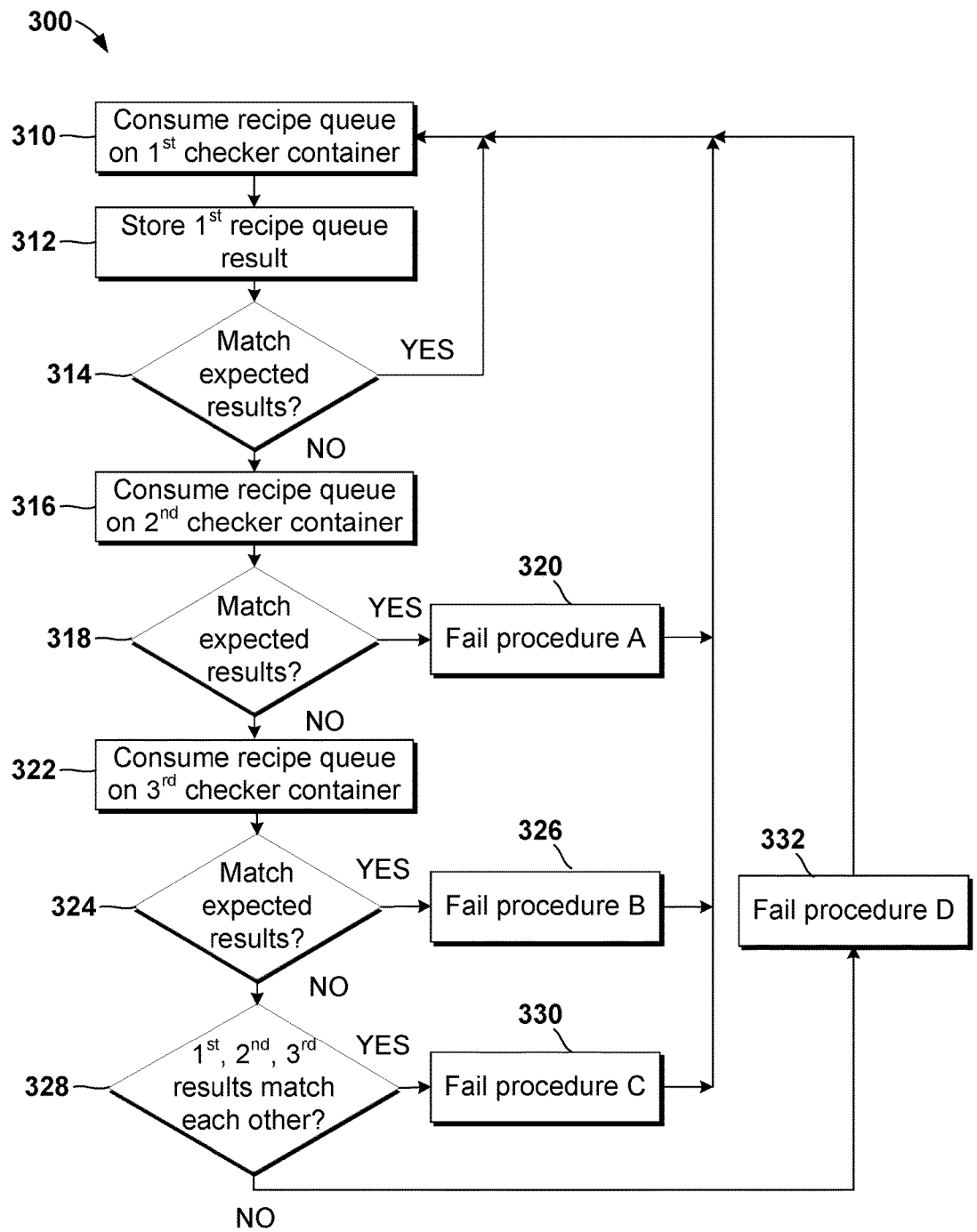
FIG. 3 is a flowchart depicting operational steps of a checker program within the data processing environment of FIG. 1, in accordance with an embodiment of the present invention.

Referring now to FIG. 3, and with continued reference to FIGS. 1 and 2, a simplified diagram of a checker program 300 is shown in accordance with an embodiment of the present invention. FIG. 3 is a flowchart depicting operational steps of checker program, (hereinafter "program"), 300 for security of containers, in accordance with an embodiment of the present invention.

A user or system administrator (hereinafter "administrator") may create a checker container on each host of computer system, using known processes. In an example there may be one thousand hosts and each of the hosts would have a checker container. The checker container is a lightweight and invisible container and is not available to a user of the host for editing nor viewing. The checker container is available for editing, reading and running of programs by a kernel of the computer server. In an embodiment, a plurality of hosts on the computer server each contain a checker container.

A recipe queue may be stored on each checker container. In an embodiment, the recipe queue of each checker container is the same. The recipe queue may be a set of programs, where each program of the set of programs may have a known expected result when each program is run. The recipe queue may be in user space area of each checker container. Recipes of the recipe queue may be pre-defined rules or programs which the checker containers can run.

A daemon may be running in each checker container. The daemon is a computer program and runs as a background process. The daemon may be configured by the administrator and may be reconfigurable. The daemon may be configurable to request an updated recipe queue, may execute the recipe queue, may collect the results of the recipe queue, may produce an output, and may verify the output. The daemon may compare a result of the recipe queue of the checker container to an expected result of the recipe queue.

A message broker mechanism may be used between checker containers on different hosts for the daemon on each checker container to communicate with other checker containers. The message broker translates a message from a sender to a receiver by translating a message protocol of each the sender and the receiver. The message broker allows nodes, servers and hosts to communicate with each other, for example, between checker containers and a file server. The recipe queue of each checker container may be on a file server.

A configuration management tool may be used, for example, PUPPET® software. The Puppet Word Mark, the Puppet Logos and all Puppet trademarks (referred to individually as a "Puppet Mark" or collectively as "Puppet Marks") are trademarks of Puppet, Inc. The configuration manager may be the control point when the recipe queue is configured on each host.

The recipe queue may be run by a user, run by a schedule, run at a specific time, or run randomly. A frequency and a trigger to run the recipe queue on a checker container of a host may be user configurable. The administrator may set the schedule or frequency of running the recipe queue of each checker contain based on business need and security need. A schedule of testing of a particular checker container may differ from another checker container, depending on each host of each checker container and the business need and security need of each host. A schedule of testing, and also dependencies which may affect the schedule of testing, may be stored on each checker container. In an embodiment, if a particular checker container runs the recipe queue and the results do not match the expected results, the frequency of testing the particular checker container may be changed to occur more frequently.

In an embodiment, a host with a higher security need may have the checker containers consume their recipe queues more frequently. In another embodiment, a computer server with a higher security need may have the checker containers of all of the hosts on the computer server consume their recipe queues more frequently.

The program 300 may implement an efficient security checker mechanism to consume recipes from an event queue.

Examples of recipes are shown below, along with a recipe expected result for each of the examples:

In example 1 of a recipe, shown below, a specific type of function call may be directed by the checker container to be performed in the kernel:

Recipe name: syscall read_validation
Recipe algorithm:
assert_exits('/dev/null')
sys_read('/dev/null', &buffer, 10)
compare_string(buffer, 10)
Recipe expected_result:
buffer=' '

In example 2 of a recipe, shown below, a recipe may calculate a kernel checksum from the checker container:

Recipe name: kernel checksum validation
Recipe algorithm:
assert_exits('/boot/vmlinux1')
output=md5sum('/boot/vmlinux')
compare_string(output, 32)
Recipe expected_result:
buffer="dc91e2f67c5c73be27fec49a4ba9e983"

The recipe queue may be consumed by a first checker container, at step 310, by a daemon of the first checker container, in a first host which contains the first checker container. In an example, there may be ten recipes in the recipe queue. The ten recipes may be run and each of the ten recipes may provide a recipe queue container result. The first recipe queue result may be stored on the first checker container, at step 312, by the daemon of the first checker container.

The daemon of the first checker container may compare the first recipe queue result to expected results of the recipe queue, at step 314.

As a result of the comparison done at step 314, if the first recipe queue result matches the expected results of the recipe queue, the program 300 continues at step 310.

As a result of the comparison done at step 314, if the first recipe queue result does not match the expected results of the recipe queue, the program 300 continues to step 316.

The daemon of the first checker container may communicate with a second checker container of a second host and request a daemon of the second checker container to consume the recipe queue on the second checker container, at step 316. The selection of the second host may be random or may be user programmable by the administrator, depending on business needs and security needs.

The daemon of the second checker container may compare the second recipe queue result to the expected results of the recipe queue, and may provide the second recipe queue result to the daemon of the first checker container, at step 318.

As a result of the comparison done at step 318, if the second recipe queue result matches the expected results of the recipe queue, the program 300 may follow fail procedure A at step 320, and then continue at step 310. In this situation, the first checker container has failed, and the second checker container has passed the testing of the recipe queue on each respective checker container. The fail procedure A may be user programmable by the administrator and may vary depending on business needs and security needs. In an embodiment, the fail procedure A may include retesting of the first checker container by consuming the recipe queue of the first checker container. In an alternate embodiment, the fail procedure A may include rebooting of the first host. The fail procedure A may be stored on the checker container A, and all of the checker containers, and may be managed by the daemon of the first checker container.

As a result of the comparison done at step 314, if the second recipe queue result does not match the expected results of the recipe queue, the program 300 continues to step 322.

The daemon of the first checker container may communicate with a third checker container of a third host and request a daemon of the third checker container to consume the recipe queue on the third checker container, at step 322. The selection of the third host may be random or may be user programmable by the administrator, depending on business needs and security needs.

The daemon of the third checker container may compare the third recipe queue result to the expected results of the recipe queue, and may provide the third recipe queue result to the daemon of the first checker container, and also to the daemon of the second checker container, at step 324.

As a result of the comparison done at step 324, if the third recipe queue result matches the expected results of the recipe queue, the program 300 may follow fail procedure B at step 326, and then continue at step 310. In this situation, the first checker container has failed, the second checker container has failed, and the third checker container has passed the testing of the recipe queue on each respective checker container. The fail procedure B may be user programmable by the administrator and may vary depending on business needs and security needs. In an embodiment, the fail procedure B may include retesting of the first checker container and retesting of the second checker container. In an alternate embodiment, the fail procedure B may include rebooting of the first host and rebooting of the second host. The fail procedure B may be stored on all of the checker containers, and may be managed by the respective daemon of each checker container.

As a result of the comparison done at step 324, if the third recipe queue result does not match the expected results of the recipe queue, the program 300 compares the first recipe queue results, the second recipe queue results, and the third recipe queue results, at step 328. This may be managed by the daemon of the first checker container and the results may be provided to the daemon of the second checker container and to the daemon of the third checker container.

As a result of the comparison done at step 328, if the first recipe queue results, the second recipe queue results, and the third recipe queue results all match each other, the program 300 may follow fail procedure C, at step 330, and then continue at step 310. In this situation, the first recipe queue result, the second recipe queue result, and the third recipe queue result, each do not match the expected results, but they match each other. This may indicate an error in the expected results. The fail procedure C may be user programmable by the administrator and may vary depending on business needs and security needs. In an embodiment, the fail procedure C may include retest and confirmation of the expected results. In an alternate embodiment, the fail procedure C may include rebooting of the first host, the second host, and the third host. The fail procedure C may be stored on all of the checker containers, and may be managed by their respective daemons.

As a result of the comparison done at step 328, if the first recipe queue results, the second recipe queue results, and the third recipe queue results do all not match each other, the program 300 may follow fail procedure D, at step 332, and then continue at step 310. In this situation, each of the three checker containers queue results do not match the expected results, and do not match each other. This may indicate a wide spread error across hosts. The fail procedure D may be user programmable by the administrator and may vary depending on business needs and security needs. In an embodiment, the fail procedure D may include rebooting of the first host, the second host, and the third host. The fail procedure D may include more testing of additional checker containers on additional hosts. The fail procedure D may be stored on the all the checker containers. The fail procedure D may include shutting the computer server down based on more than a threshold number of recipe queue results not matching the expected results.

The checker container test results, from consumption of the recipe queue, may be stored in memory, such as the data storage device 114. The results of a comparison of recipe queue results from different contains may also be stored in memory. A user or administrator of the computer server, and a user or administrator of a host may be notified as well.

In an embodiment, a checker container containing a recipe queue may be created on each host of the system. The recipe queue on each checker container of each host may consume each recipe queue. The user or administrator of the computer system may be notified of any failure of a comparison of each recipe queue in a checker container of a host, to the expected results. The user or administrator of the host may be notified of any failure of a comparison of each recipe queue in a checker container of a host, to the expected results. An administrator of a host may also be notified of any checker container recipe queue consumption.

Actions which may be taken by the user or an administrator after detection of a security program, such as when the test results do not match the expected test results, may include further testing of a failing host. In an embodiment, the program 300 may be integrated with information technology management, and monitoring software may be implemented. Tools for malware identification or system monitoring may be used. The host may be comprised and may need to be rebooted or other corrective action taken. In an instance where a reboot of the host results in no further test fails, the incident may be documented and reported. If a security problem persists after a reboot, i.e. the test results of the recipe queue do not match the expected test results, the host or the computer server may need to be shut down. An intervention from the administrator may be required. The fail procedures A, B, C, and D, may include any of the steps identified above and may vary based on business needs and security needs of each host and of the computer server.

An agent check may be running the program 300 isolated in an invisible checker container, which may indicate the test results may be reliable. The recipes may be pre-loaded from an image hub from the system administrator and may not accessible by the host. The checker container may run the recipe queue and may also sleep or be idle. It may also receive comparison requests from other checker containers on other hosts. An example of an execution of the checker container may be described as follows:
  sleep read recipe queue
  recipe 1 check → OK
  comparison request from a second checker container
  recipe 2 check → OK
  . . .
  recipe N check → OK
  sleep
  comparison request from a third checker container
  comparison request from a fourth checker container
  read recipe queue
  recipe 1 check → OK
  recipe 2 check → OK
  recipe 3 check → FAIL → recipe 3 recheck → FAIL
  reboot
  notify sysadmin
  shutdown The program 300 may create a trusted method to identify a host or computer server which is vulnerable by matching security checks between different hosts.

The program 300 has benefits for identifying a potentially comprised host of a computer server, and may provide an opportunity to identify a problem prior to the problem spreading to the kernel or other hosts.

Figure 4:
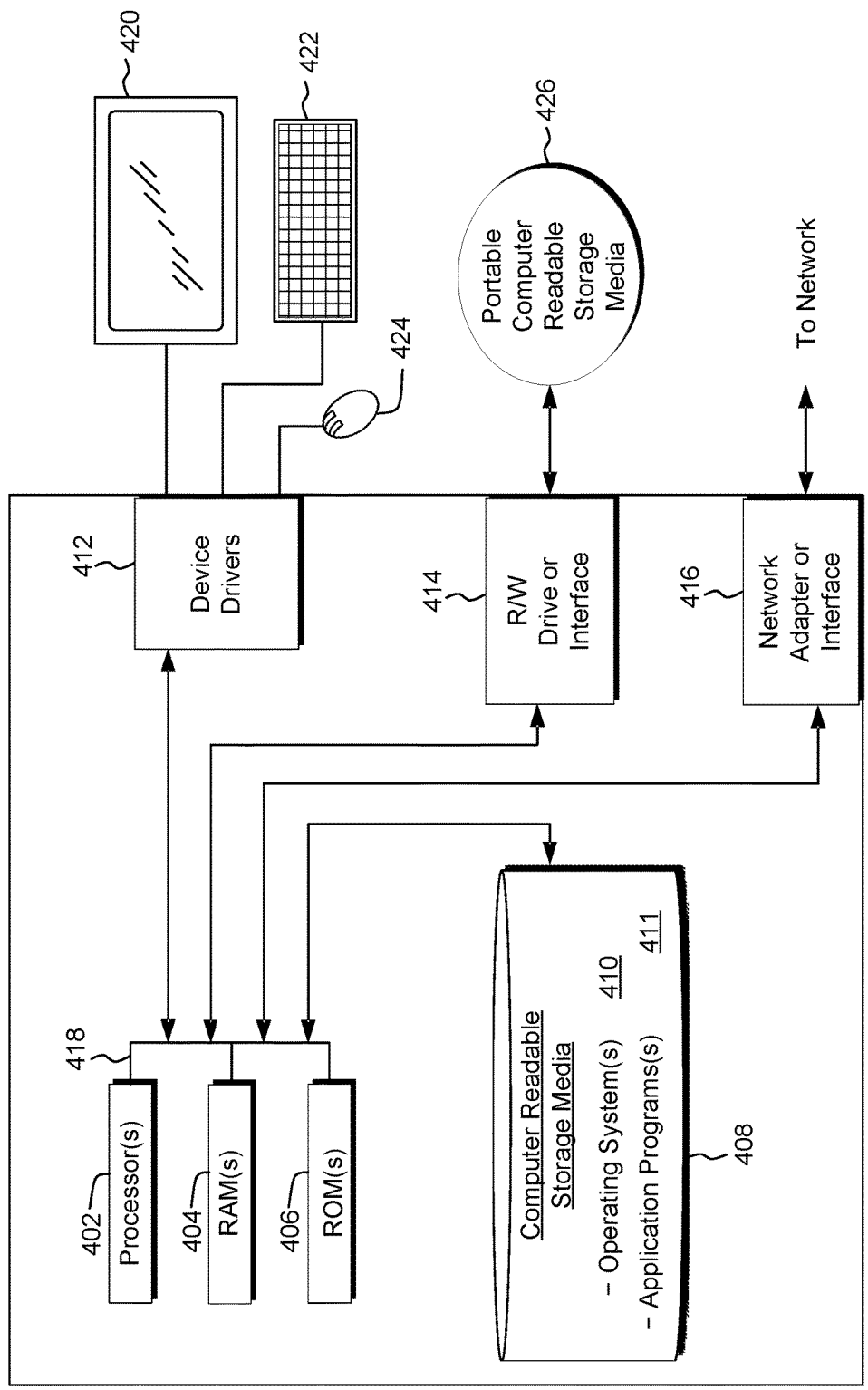
FIG. 4 is a block diagram of internal and external components of computers and servers depicted in FIG. 1, in accordance with an embodiment of the present invention.
Figure 5:
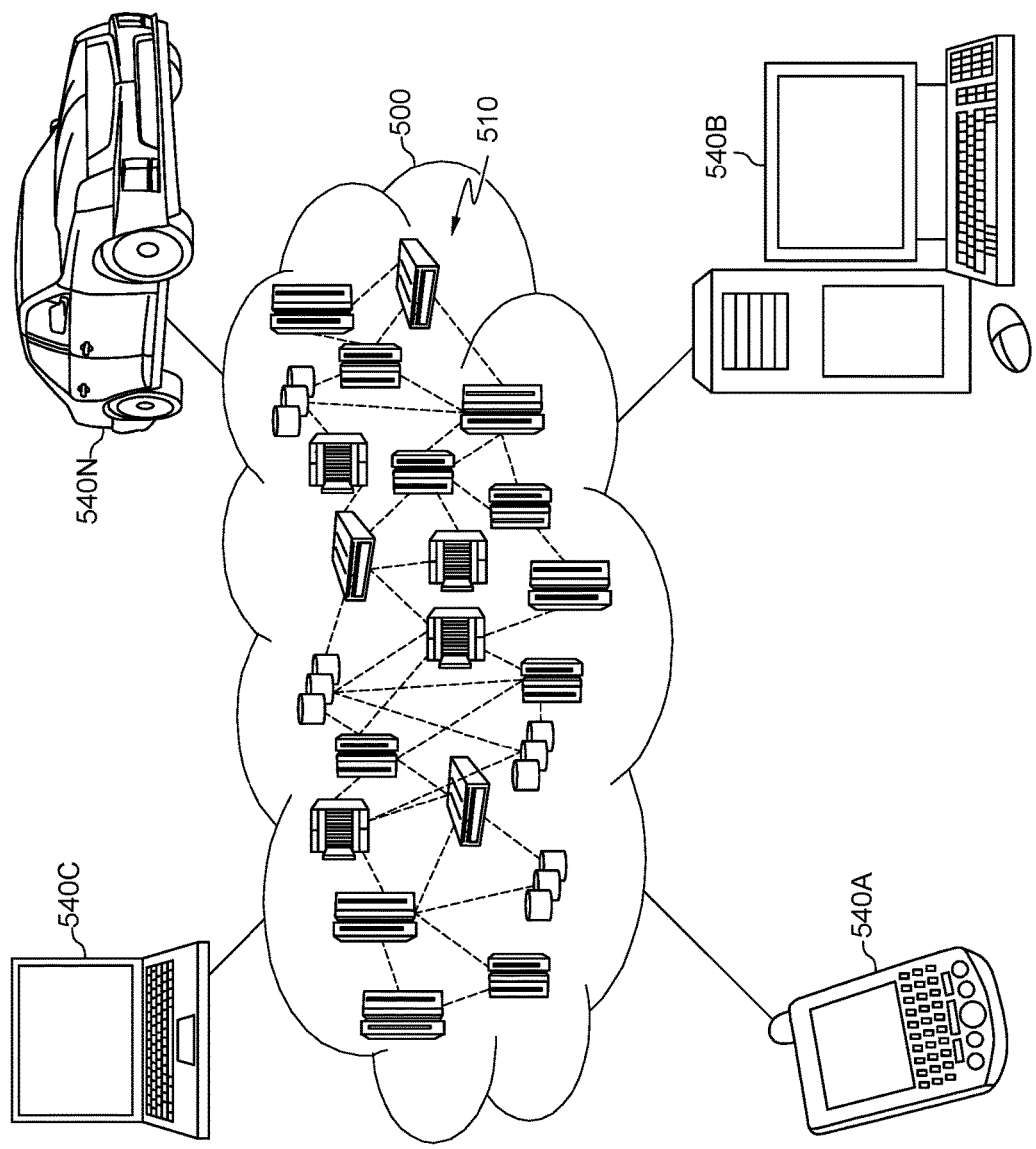
FIG. 5 is a block diagram of functional layers of an illustrative cloud computing environment, including the distributed data processing environment depicted in FIG. 1, in accordance with an embodiment of the present disclosure.

Referring now to FIG. 4, a block diagram of components of a computing device, such as the client computer 102 or the server computer 104, of the system 100 of FIG. 1, in accordance with an embodiment of the present invention is shown. It should be appreciated that FIG. 4 provides only an illustration of an implementation and does not imply any limitations with regard to the environments in which different embodiments may be implemented. Many modifications to the depicted environment may be made.

The computing device may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, the checker program 300, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device may also include the R/W drive or interface 414 to read from and write to one or more portable computer readable storage media 426. Application programs 411 on the computing device may be stored on one or more of the portable computer readable storage media 426, read via the respective R/W drive or interface 414 and loaded into the respective computer readable storage media 408.

The computing device may also include the network adapter or interface 416, such as a TCP/IP adapter card or wireless communication adapter (such as a 4G wireless communication adapter using OFDMA technology). Application programs 411 on the computing device may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

The computing device may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics of cloud computing include on-demand self-service, broad network access, resource pooling, rapid elasticity, and measured service, which are each described below.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models include Software as a Service, Platform as a Service, and Infrastructure as a Service, which are each described below.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models include private cloud, community cloud, public cloud, and hybrid cloud, which are each described below.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 540A, desktop computer 540B, laptop computer 540C, and/or automobile computer system 540N may communicate. Cloud computing nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 540A-N shown in FIG. 5 are intended to be illustrative only and that cloud computing nodes 510 and cloud computing environment 500 can communicate with any type of computerized device over any type of network and/or network addressable connection (e.g., using a web browser).

Figure 6:
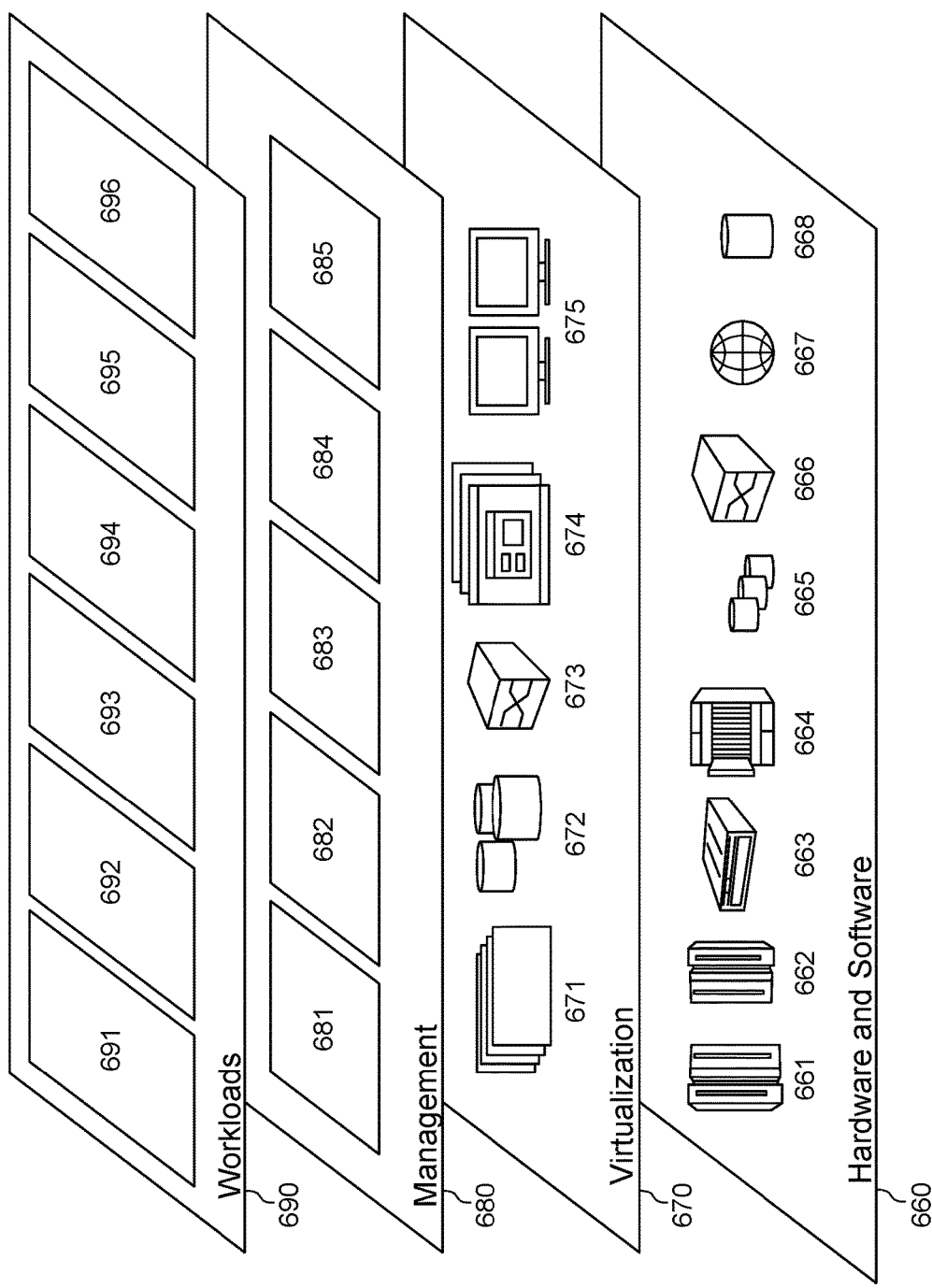
FIG. 6 is a functional block diagram of functional layers of the illustrative cloud computing environment of FIG. 5, in accordance with an embodiment of the present invention.

Referring now to FIG. 6, a set of functional abstraction layers provided by cloud computing environment 500 (as shown in FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672, for example the data storage device 114 as shown in FIG. 1; virtual networks 673, including virtual private networks; virtual applications and operating systems 674; and virtual clients 675.

In an example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and checker program 696. The checker program 696 may relate to creating checker containers to verify functionality of a host on a computer server, for example, the checker program 300.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing container security by a computer, the method comprising:

storing a recipe queue on a set of checker containers, wherein each checker container of the set of checker containers is on a corresponding host of a set of hosts of a computer system, wherein each checker container of the set of checker containers is not accessible to a corresponding host of the set of hosts, wherein the recipe queue comprises a predefined set of rules;

consuming the recipe queue on a first checker container of the set of checker containers, wherein the first checker container is on a first host of the set of hosts;

storing a first result from the consuming of the recipe queue on the first checker container in the first checker container;

comparing the first result with an expected result of the recipe queue, wherein the expected result is stored in the first checker container;

based on the first result not matching the expected result, follow a first fail procedure from a plurality of fail procedures;

consuming the recipe queue on one or more additional checker containers of the set of checker containers, based on the first result not matching the expected result, wherein the one or more additional checker containers are each on one or more corresponding additional hosts of the computer system;

storing one or more additional results from the consuming of the recipe queue on the one or more additional checker containers in the one or more additional checker containers each on the corresponding one or more additional checker containers;

comparing the one or more additional results with the expected result of the recipe queue, wherein the expected result is stored on the corresponding one or more additional checker containers;

following one or more corresponding fail procedures from the plurality of fail procedures, based on the one or more additional results not matching the expected result; and reconfirming the expected result, based on three or more results matching each other.

2. The method of claim 1, further comprising:

consuming the recipe queue on a second checker container of the set of checker containers, based on the first result not matching the expected result, wherein the second checker container is on a second host of the set of hosts;

storing a second result from the consuming of the recipe queue on the second checker container in the second checker container;

comparing the second result with the expected result of the recipe queue, wherein the expected result is stored in the second checker container; and following a second fail procedure from the plurality of fail procedures, based on the second result not matching the expected result.

3. The method of claim 2, further comprising:

following a third fail procedure from the plurality of fail procedures, based on the second result matching the expected result, wherein the third fail procedure comprises rebooting the first host.

4. The method of claim 1, further comprising:

rebooting the one or more corresponding additional hosts, based on the one or more additional results not matching the expected result.

5. The method of claim 4, further comprising:

shutting the computer system down, based on more than a threshold number of recipe queue results not matching the expected result, wherein the recipe queue results comprise the first result, the second result and the one or more additional results.

6. A computer program product for managing container security, the computer program product comprising:

one or more computer-readable storage media and program instructions stored on the one or more computer-readable storage media, the program instructions comprising:

program instructions to store a recipe queue on a set of checker containers, wherein each checker container of the set of checker containers is on a corresponding host of a set of hosts of a computer system, wherein each checker container of the set of checker containers is not accessible to a corresponding host of the set of hosts, wherein the recipe queue comprises a predefined set of rules;

program instructions to consume a recipe queue on a first checker container of the set of checker containers, wherein the first checker container is on a first host of the set of hosts;

program instructions to store a first result from the consuming of the recipe queue on the first checker container in the first checker container;

program instructions to compare the first result with an expected result of the recipe queue, wherein the expected result is stored in the first checker container;

based on the first result not matching the expected result, program instructions to follow a first fail procedure from a plurality of fail procedures;

program instructions to consume the recipe queue on one or more additional checker containers of the set of checker containers, based on the first result not matching the expected result, wherein the one or more additional checker containers are each on one or more corresponding additional hosts of the computer system;

program instructions to store one or more additional results from the consuming of the recipe queue on the one or more additional checker containers in the one or more additional checker containers each on the corresponding one or more additional checker containers;

program instructions to compare the one or more additional results with the expected result of the recipe queue, wherein the expected result is stored on the corresponding one or more additional checker containers;

program instructions to follow one or more corresponding fail procedures from the plurality of fail procedures, based on the one or more additional results not matching the expected result; and program instructions to reconfirm the expected result, based on three or more results matching each other.

7. The computer program product of claim 6, further comprising:

program instructions to consume the recipe queue on a second checker container of the set of checker containers, based on the first result not matching the expected result, wherein the second checker container is on a second host of the set of hosts;

program instructions to store a second result from the consuming of the recipe queue on the second checker container in the second checker container;

program instructions to compare the second result with the expected result of the recipe queue, wherein the expected result is stored in the second checker container; and program instructions to follow a second fail procedure from the plurality of fail procedures, based on the second result not matching the expected result.

8. The computer program product of claim 7, further comprising:

program instructions to follow a third fail procedure, based on the second result matching the expected result, wherein the third fail procedure comprises rebooting the first host.

9. The computer program product of claim 6, further comprising:

program instructions to reboot the one or more corresponding additional hosts, based on the one or more additional results not matching the expected result.

10. The computer program product of claim 9, further comprising:

program instructions to shut the computer system down, based on more than a threshold number of recipe queue results not matching the expected result, wherein the recipe queue results comprise the first result, the second result and the one or more additional results.

11. A computer system for managing container security, the computer system comprising:

one or more computer processors, one or more computer-readable storage media, and program instructions stored on the one or more computer-readable storage media for execution by at least one of the one or more computer processors, the program instructions comprising:

program instructions to store a recipe queue on a set of checker containers, wherein each checker container of the set of checker containers is on a corresponding host of a set of hosts of the computer system, wherein each checker container of the set of checker containers is not accessible to a corresponding host of the set of hosts, wherein the recipe queue comprises a predefined set of rules;

program instructions to consume a recipe queue on a first checker container of the set of checker containers, wherein the first checker container is on a first host of the set of hosts;

program instructions to store a first result from the consuming of the recipe queue on the first checker container in the first checker container;

program instructions to compare the first result with an expected result of the recipe queue, wherein the expected result is stored in the first checker container;

based on the first result not matching the expected result, program instructions to follow a first fail procedure from a plurality of fail procedures;

program instructions to consume the recipe queue on one or more additional checker containers of the set of checker containers, based on the first result not matching the expected result, wherein the one or more additional checker containers are each on one or more corresponding additional hosts of the set of hosts;

program instructions to store one or more additional results from the consuming of the recipe queue on the one or more additional checker containers in the one or more additional checker containers each on the corresponding one or more additional checker containers;

program instructions to compare the one or more additional results with the expected result of the recipe queue, wherein the expected result is stored on the corresponding one or more additional checker containers;

program instructions to follow one or more corresponding fail procedures from the plurality of fail procedures, based on the one or more additional results not matching the expected result; and program instructions to reconfirm the expected result, based on three or more results matching each other.

12. The computer system of claim 11, further comprising:

program instructions to consume the recipe queue on a second checker container of the set of checker containers, based on the first result not matching the expected result, wherein the second checker container is on a second host of the set of hosts;

program instructions to store a second result from the consuming of the recipe queue on the second checker container in the second checker container;

program instructions to compare the second result with the expected result of the recipe queue, wherein the expected result is stored in the second checker container; and program instructions to follow a second fail procedure from the plurality of fail procedures, based on the second result not matching the expected result.

13. The computer system of claim 12, further comprising:

program instructions to determine the second result match the expected result of the recipe queue; and program instructions to follow a third fail procedure, based on the second result matching the expected result, wherein the third fail procedure comprises rebooting the first host.

14. The computer system of claim 11, further comprising:

program instructions to reboot the one or more corresponding additional hosts, based on the one or more additional results not matching the expected result.

15. The computer system of claim 14, further comprising:

program instructions to shut the computer system down, based on more than a threshold number of recipe queue results not matching the expected result, wherein the recipe queue results comprise the first result, the second result and the one or more additional results.

* * * * *